United States Patent
Chien et al.

(10) Patent No.: US 12,430,926 B2
(45) Date of Patent: Sep. 30, 2025

(54) METHOD FOR RECOGNIZING ILLUMINATION STATE OF TRAFFIC LIGHTS, ELECTRONIC DEVICE, AND STORAGE MEDIUM

(71) Applicant: HON HAI PRECISION INDUSTRY CO., LTD., New Taipei (TW)

(72) Inventors: Shih-Chao Chien, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 389 days.

(21) Appl. No.: 18/091,126

(22) Filed: Dec. 29, 2022

(65) Prior Publication Data
US 2023/0401875 A1  Dec. 14, 2023

(30) Foreign Application Priority Data
Jun. 8, 2022 (CN) .......................... 202210647518.9

(51) Int. Cl.
*G06V 20/00* (2022.01)
*G06T 7/11* (2017.01)
(Continued)

(52) U.S. Cl.
CPC ............. *G06V 20/584* (2022.01); *G06T 7/11* (2017.01); *G06T 7/70* (2017.01); *G06V 10/267* (2022.01);
(Continued)

(58) Field of Classification Search
CPC .... G06V 20/584; G06V 10/267; G06V 10/56; G06V 10/60; G06V 10/82; G06T 7/11;
(Continued)

(56) References Cited

U.S. PATENT DOCUMENTS

2018/0374345 A1\* 12/2018 Suzuki ..................... G08G 1/04
2019/0087961 A1\* 3/2019 Tian .......................... G06T 7/90
(Continued)

FOREIGN PATENT DOCUMENTS

| CN | 105930819 A | 9/2016 |
| CN | 110598560 A | 12/2019 |

OTHER PUBLICATIONS

Jang et al, Multiple Exposure Images based Traffic Light Recognition, 2014 IEEE Intelligent Vehicles Symposium (IV) (Year: 2014).\*
(Continued)

*Primary Examiner* — Xiao Liu
(74) *Attorney, Agent, or Firm* — ScienBiziP, P.C.

(57) ABSTRACT

A vehicle-borne method for recognizing the illumination state of traffic lights even against a backlighting of strong sunlight or other light source obtains a first image of a set of traffic lights in a road traffic environment. A segmentation map is acquired by dividing a first region from the first image, and an illumination region in the segmentation map is extracted by marking RGB pixels in the region which are of a preset threshold in brightness according to a training model. A lit color of the set of traffic lights is recognized according to a position of the illumination region in the segmentation map. By utilizing the method, accuracy of recognition of illumination state of traffic lights is improved.

15 Claims, 3 Drawing Sheets

(51) Int. Cl.
  *G06T 7/70*    (2017.01)
  *G06V 10/26*   (2022.01)
  *G06V 10/56*   (2022.01)
  *G06V 10/60*   (2022.01)
  *G06V 10/82*   (2022.01)
  *G06V 20/58*   (2022.01)

(52) U.S. Cl.
  CPC .............. *G06V 10/56* (2022.01); *G06V 10/60* (2022.01); *G06V 10/82* (2022.01); *G06T 2207/10024* (2013.01); *G06T 2207/20021* (2013.01); *G06T 2207/20084* (2013.01); *G06T 2207/30252* (2013.01)

(58) Field of Classification Search
  CPC ............. G06T 7/70; G06T 2207/10024; G06T 2207/20021; G06T 2207/20084; G06T 2207/30252
  See application file for complete search history.

(56) References Cited

U.S. PATENT DOCUMENTS

| | | | |
|---|---|---|---|
| 2021/0014402 A1* | 1/2021 | Nossek | G06T 5/50 |
| 2021/0201057 A1* | 7/2021 | Lin | G06F 18/24 |
| 2024/0375613 A1* | 11/2024 | Takagi | G06V 20/56 |

OTHER PUBLICATIONS

He et al, MASK R-CNN, ICCV (Year: 2017).*

* cited by examiner

# METHOD FOR RECOGNIZING ILLUMINATION STATE OF TRAFFIC LIGHTS, ELECTRONIC DEVICE, AND STORAGE MEDIUM

FIELD

The present application relates to a technical field of image processing, and more particularly to a method for recognizing the state of traffic lights, an electronic device, and a storage medium.

BACKGROUND

When a vehicle passes through a crossroad controlled by traffic lights, it needs to recognize an illuminated color of the traffic lights based on an image recognition technology, and then perform corresponding driving operations according to the color of the traffic lights.

However, light changes of the backlight may influence recognition accuracies of the illuminated color of the traffic light.

Therefore, in the backlight scene, it is difficult to recognize traffic lights accurately.

DETAILED DESCRIPTION

The accompanying drawings combined with the detailed description illustrate the embodiments of the present application hereinafter. It is noted that embodiments of the present disclosure and features of the embodiments can be combined, when there is no conflict.

Various details are described in the following descriptions for a better understanding of the present application, however, the present application may also be implemented in other ways other than those described herein. The scope of the present application is not to be limited by the specific embodiments disclosed below. Unless defined otherwise, all technical and scientific terms used herein have the same meaning as commonly understood by one of ordinary skill in the art to which the present application belongs. The terms used herein in the present application are only for the purpose of describing specific embodiments and are not intended to limit the present disclosure.

Figure 1:
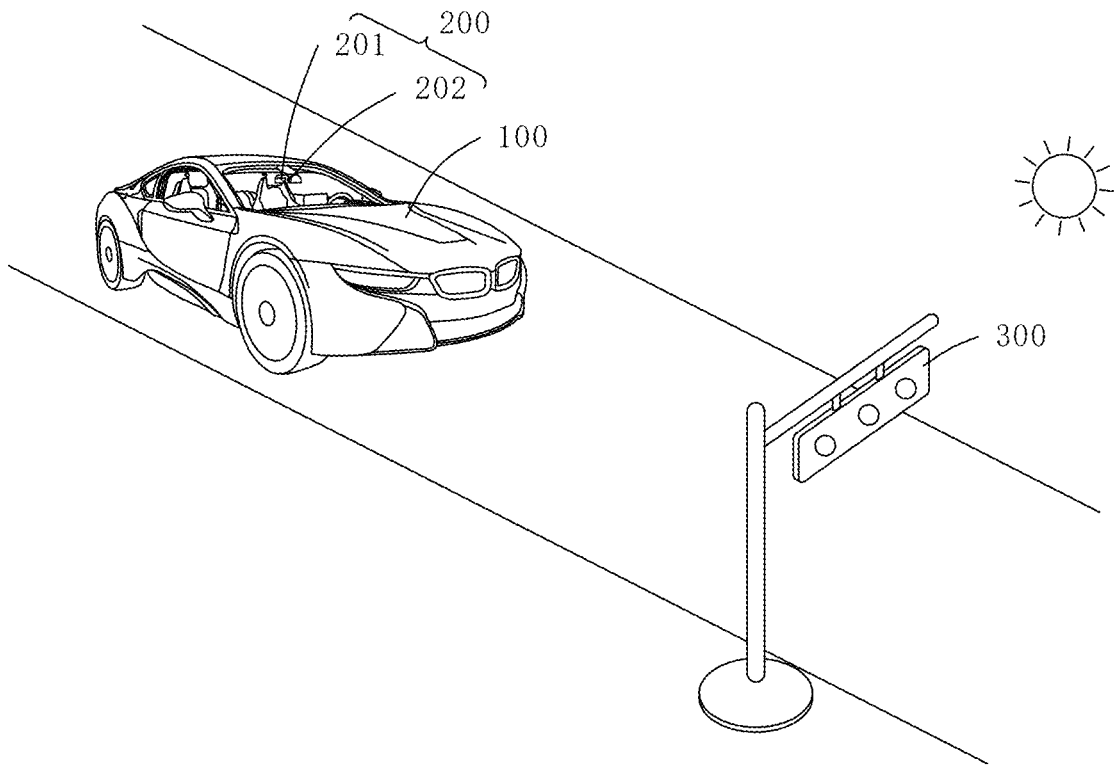
FIG. 1 is a schematic diagram of an implementation environment for recognizing traffic lights provided in an embodiment of the present application.

FIG. 1 shows an implementation environment for recognizing illumination state of traffic lights provided in an embodiment of the present application.

As shown in FIG. 1, an implementation environment includes a vehicle 100, a traffic light recognition module 200, and a set of traffic lights 300.

Figure 3:
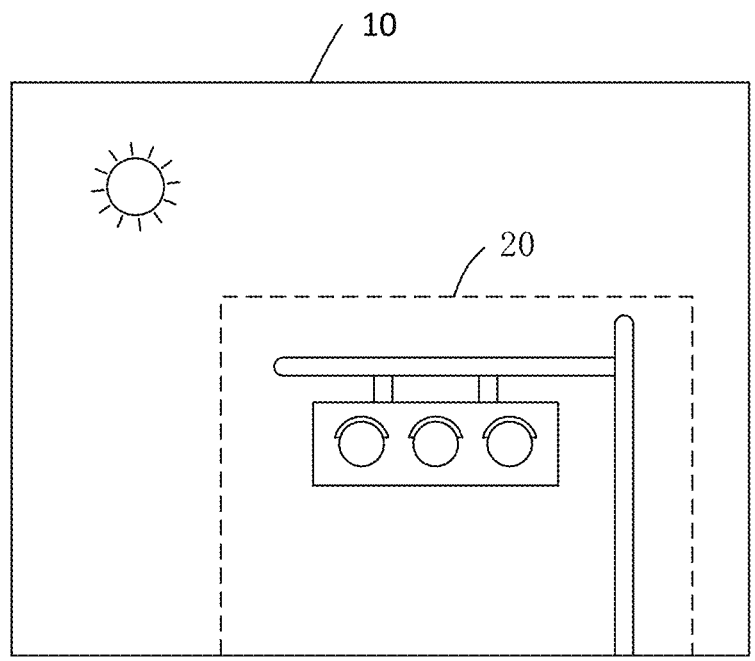
FIG. 3 is a schematic diagram of a first image provided in an embodiment of the present application.

In one embodiment, the traffic light recognition module 200 includes a processor 201 and a camera device 202. Both of the processor 201 and the camera device 202 can be mounted on the vehicle 100. The camera device 202 captures images of scene in front of the vehicle 100. As shown in FIG. 3, the processor 201 acquires images captured by the camera device 202. The processor 201 processes the image captured by the camera device 202, and recognizes traffic lights and their state of illumination in the captured images. In another embodiment, the traffic light recognition module 200 can be assembled in a vehicle-mounted system, the processor 201 also can be a processor of the vehicle-mounted system, and the camera device 202 also can be one or more cameras of the vehicle 100.

The set of traffic lights 300 controls traffic, and generally includes a red light, a green light, and a yellow light. Specifically, the red light indicates stop, the yellow means get ready to stop or move ahead, while green allows you to go forward.

In at least one embodiment, the roadway scene in front of the vehicle 100 can include, but is not limited to, roads, other vehicles, isolation belts or green belts, traffic signs, traffic lights, light poles, buildings, bridges, for example.

In at least one embodiment, the camera device 202 includes a driving recorder. The driving recorder records information such as images and sounds during driving of the vehicle 100. In other embodiments, the camera device 202 may be connected to the driving recorder. Where a driving recorder in installed in the vehicle 100, the driving recorder can record the images and sounds of an entire driving process of the vehicle 100, and provide effective evidence for traffic accidents.

In one embodiment, the driving recorder may also include functions such as a global positioning system (GPS) positioning, driving track capture, reversing image, remote monitoring, electronic pet, navigation, for example, functions of the driving recorder are not limited herein.

In one embodiment, a method for recognizing traffic lights is executed by a processor (e.g., the processor 201), and the processor is installed on the vehicle 100. The processor may have a function of recognizing traffic lights 300 based on an image recognition and image analysis technology. For example, the camera device 202 captures images of a set of traffic lights 300, and the processor 201 acquires the images from the camera device 202. The processor 201 recognizes a color of illumination among the set of traffic lights 300 in the images by processing the images. Thus, the processor 201 may recognize the illumination state in a set of traffic lights 300 appearing in front of the vehicle 100, and can output an active reminder to the driver of the vehicle 100.

In at least one embodiment, the vehicle 100 also includes a display screen not shown in (FIG. 1), and the processor 201 is connected to the display screen. In response that the processor 201 determines the illumination state of the traffic lights 300, the display screen displays same, or displays a lit color of the light currently showing (such as red, green, or yellow).

In at least one embodiment, the vehicle 100 may also include a sound transmitter (not shown in FIG. 1), and the processor 201 is connected to the sound transmitter. In response that the processor 201 determines the color of illumination of the traffic lights 300 in front of the vehicle 100, the sound transmitter broadcasts audible information that indicates the color, or broadcasts audible information as to the color (such as red, green, or yellow). For example, the audible information may be "traffic light showing red."

As shown in FIG. 1, the set of traffic lights 300 is generally between a strong light source (such as the sun, as in FIG. 1) and the camera device 202. Thus, in the captured image, the color of traffic lights 300 may be overwhelmed, and the color currently showing is difficult to recognize.

In an embodiment, when a scene without the sun as a backlight, the lit color of the lit light in the set of traffic lights 300 may be seen from the image. Thus, among the set of traffic lights 300, the color of light in the lit state can be determined. However, in bright sunlight, the lit color of the set of traffic lights 300 is difficult to recognize from the image. Accordingly, in an embodiment provided by the present application, the illumination in the lit state is not distinguished by color. Instead, a relative position of each of the traffic lights can be recognized, for determining which light is showing. For example, the lights of the set of traffic lights 300 may be arranged from left to right in a sequence of red, yellow, and green.

The method in the above embodiments of the present application can recognize the set of traffic lights 300 in bright sunlight, and also determine the lit color of the set of traffic lights 300, so as to accurately achieve recognition of traffic lights and their state.

Figure 2:
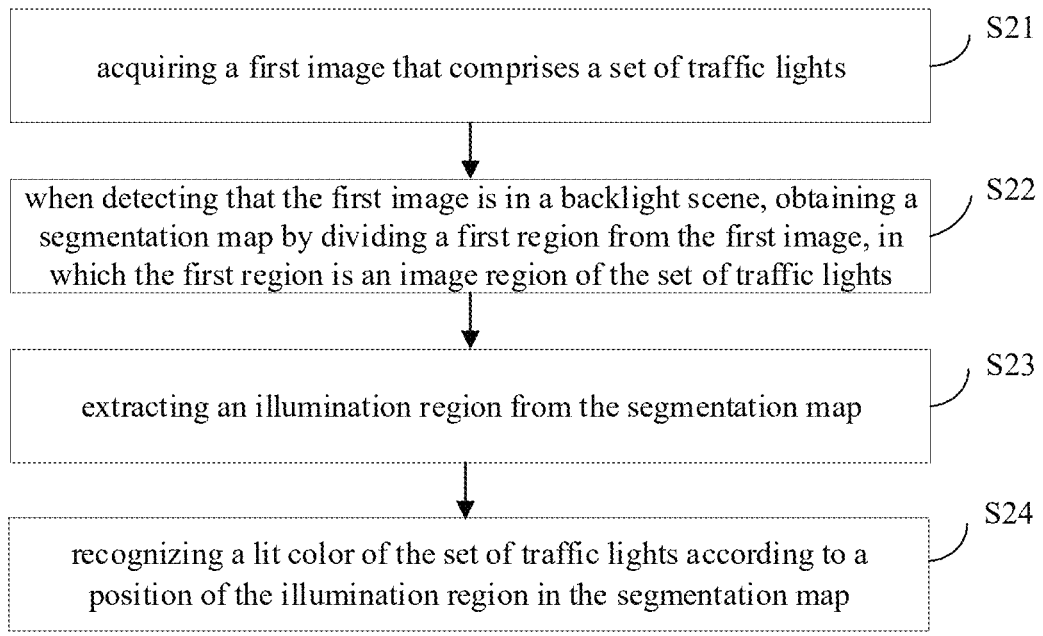
FIG. 2 is a flowchart of a method for recognizing illumination states of traffic lights provided in an embodiment of the present application.

FIG. 2 is a flowchart of a method for recognizing illumination state of traffic lights provided in an embodiment of the present application. As shown in FIG. 2, the method for recognizing traffic lights may be executed by the processor 201 shown in FIG. 1.

In block S21, the processor 201 acquires a first image that includes a set of traffic lights.

In one embodiment, the camera device 202 is installed in front of the vehicle 100, and the camera device 202 captures images of various kinds of scene in front of the vehicle 100, and obtain images of the environment. Specifically, the images of the driving environment can also be captured by the camera device 202 of a driving recorder.

The set of traffic lights 300 may include signal lights for motor vehicles, for unpowered vehicles, for pedestrians, for permitted directions, for lane activity, and a flashing warning signal light and railway level crossing signal light, for example.

A set of signal lights for motor vehicles may include three unpatterned circular lights of red, yellow and green, and may be constructed or configured to show specific restrictions or filter movements. A set of signal lights for bicycles for example may include three circular lights with bicycle patterns inside in red, yellow and green color. A 'Red man' or 'green man' light forbids or allows pedestrians to cross the road.

A lane signal light may include fork and arrow patterns, to direct vehicles in the lane to follow such directions. A set of direction indicator signal lights may include at least three lights with arrow patterns in red, yellow, and green, for guiding motor vehicles according to an indicated direction. For example, an arrow that points to left indicates a direction towards left, an arrow that points straight up indicates straight on, an arrow that points to right indicates a direction towards right.

In one embodiment, the processor 201 obtains a driving environment image from the camera device 202, and detects the driving environment image through an image recognition technology, and recognizes whether traffic lights 300 is included in the driving environment image.

Figure 4:
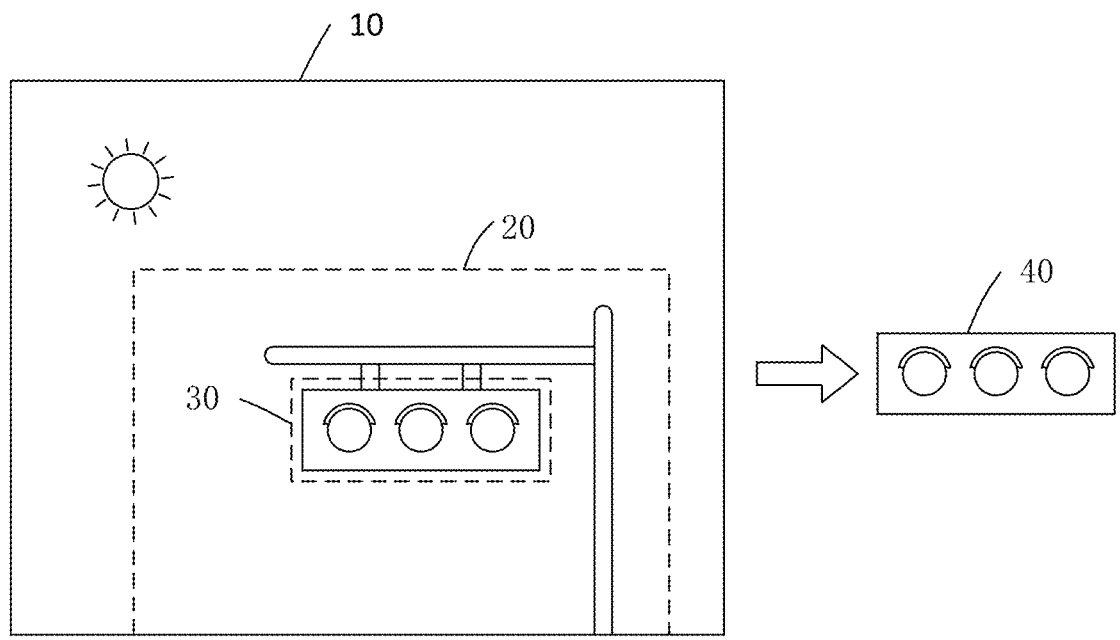
FIG. 4 is a schematic diagram of a first image after segmentation in an embodiment of the present application.

As shown in FIG. 4, a driving environment image may include an image region 20 showing the set of traffic lights 300. The driving environment image is determined as the first image 10, and the processor 201 acquires the first image 10. In response that the driving environment image does not include any image region of the set of traffic lights 300, the processor 201 does not acquire the driving environment image.

For example, a deep learning technology can be used to recognize the captured images of the driving environment image, and determine whether the driving environment image includes the set of traffic lights 300. Specifically, the processor collects training sample images, and trains a deep learning model for image recognition based on the training sample images. The deep learning model includes, but is not limited to, AlexNet, VGGNet, GoogLeNet, ResNet, DenseNet, for example.

For example, the first image 10 includes, but is not limited to, roads, other vehicles, isolation belts or green belts, traffic signs, traffic lights, and light poles, buildings, bridges, and the like, which are not specifically limited in this embodiment of the present application.

In one embodiment, the first image 10 at least includes the image region 20 of the set of traffic lights 300, which is not specifically limited in the embodiments.

In block S22, when the processor 201 detects a certain brightness of sunlight or other light source in the first image, a segmentation map is obtained by dividing a first region from the first image, in which the first region is an image region of the set of traffic lights 300.

In one embodiment, the processor 201 recognizes the lit color of the set of traffic lights 300 in the first image 10. If the color of illumination of the traffic light cannot be recognized, the processor 201 determines that the first image 10 is in a sunlighted scene.

In one embodiment, the processor 201 may recognize the color of the image region 20 of the set of traffic lights 300 using a first network model. In response that the first network model cannot output the color of the image region 20 of the set of traffic lights 300, this indicates that the first network model cannot recognize the color showing in the image region 20 of the set of traffic lights 300. Thus the processor 201 determines that the first image 10 is in the sunlit scene. For example, the first network model may be a YOLO detection network, etc.

In one embodiment, the first network model can be obtained by training in the following ways. The processor 201 acquires a training dataset, which includes a plurality of images. Each of the plurality of images includes location boxes of all traffic lights and a type of color illumination. The first network model uses the training dataset to learn how to frame the image region 20 of the set of traffic lights 300 in the image, and learns to determine the type of the lit light based on the image region 20 of the set of traffic lights 300. Specifically, the types of color illumination can be a red light, a yellow light, a green light. In another embodiment, the type of the lit light can be a first light, a second light, or a third light. The processor 201 pre-determines traffic instructions corresponding to each type of light.

Figure 5:
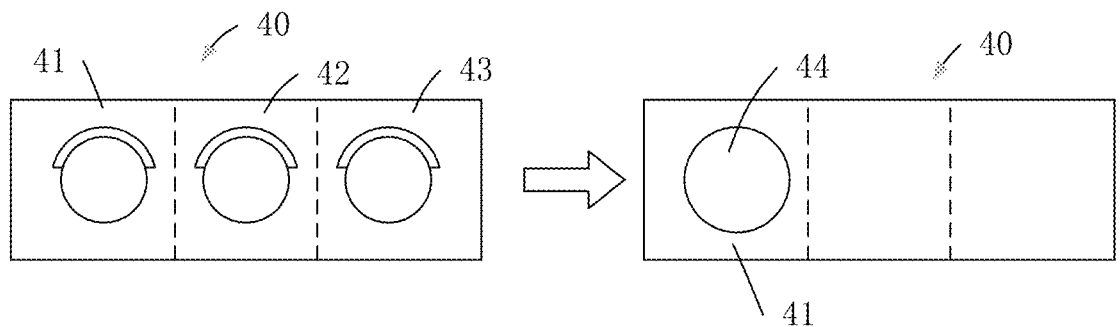
FIG. 5 is a schematic diagram of an illumination region acquired in an embodiment of the present application.

As shown in FIG. 5, in response that the processor 201 detects that the first image 10 is in a sunlit environment, a segmentation network is used to divide a first region 30 in the first image 10 to obtain a segmentation map 40. Specifically, the image region 20 includes the first region 30, the image region 20 includes the set of traffic lights 300 and at least part of their structure. Thus, the image region 20 may include sets of traffic lights 300, and the first region 30 includes a set of traffic lights 300.

In one embodiment, a set of traffic lights 300 can be a light group including lamps in three colors, such as red, yellow, and green.

Specifically, the processor 201 inputs the first image 10 into a segmentation network based on deep learning, and receives a position of the set of traffic lights 300 in the first image 10 output by the segmentation network, for example, the position of the first region 30. The first region 30 in the first image 10 is divided according to the position of the first region 30 to obtain a segmentation map 40. For example, the segmentation network can be SegNet, U-Net, FCN, etc.

For example, the segmentation network can be obtained by a training procedure. Under such procedure, the processor 201 obtains the training data including the sunlit scene, and collects about 5,000 road images when sunlit as training data for the segmentation network. Then the processor 201 trains the segmentation network, and the training procedure may be performed for 500 iterations, the segmentation network segments the location of the set of traffic lights 300 in the image, and the segmentation network training is thus completed.

In one embodiment, the first image 10 may include one or more sets of traffic lights 300. In response that the first image 10 includes a plurality of sets of traffic lights 300, the first image 10 includes a plurality of first regions 30. Thus, the segmentation network divides the plurality of first regions 30 to obtain a plurality of segmentation maps 40.

In block S23, the processor 201 extracts an illumination region from the segmentation map.

In one embodiment, the processor 201 converts an RGB (red green blue) color gamut of pixels in the segmentation map 40 to a hue, saturation, value (HSV) color gamut, obtains a converted segmentation map 40, and extracts an illumination region 44 from the converted segmentation map 40 using a preset threshold.

In one embodiment, the processor 201 acquires a value of a V channel of each pixel in the converted segmentation map 40, and determines pixels whose values of the V channel are greater than the preset threshold as the first pixels, and determines the illumination region 44 by filtering a region where the first pixels are located.

In at least one embodiment, the processor 201 acquires values of the V channel of all pixels in the converted segmentation map 40, and determines a total value according to the acquired values. The processor 201 obtains a preset threshold by averaging the total values.

In one embodiment, as shown in FIG. 5, the processor 201 converts an RGB color gamut of pixels in the segmentation map to a HSV color gamut, and acquires the value of the V channel of all the pixels in the converted segmentation map 40. Specifically, the value of the V channel represents the pixel brightness. The processor 201 averages the values of all of the V channels in the converted segmentation map 40, and determines the average value as a preset threshold. The processor 201 compares the value of the V channel of all the pixels in the converted segmentation map 40 with the preset threshold. The processor 201 sets as 1 a pixel that is greater than the preset threshold, and sets as zero a pixel that is not at least equal to the preset threshold, so as to filter out regions with high brightness. That is, the processor 201 obtains the region with the pixels of 1, and extracts the illumination region 44. Specifically, the region with the higher value of the V channel is a light region where the set of traffic lights 300 is positioned, and the image region where the illumination is located is determined as the illumination region 44.

In block S24, the processor 201 recognizes a lit color of the set of traffic lights according to a position of the illumination region in the segmentation map.

In one embodiment, the processor 201 divides the segmentation map 40 into three equal regions, each of the three regions corresponds to a single signal light in the set of traffic lights 300. The processor 201 acquires a location of the illumination region 44 and a location of each of the three regions. Then, the processor 201 determines as a target region the region where the illumination region 44 is located from the three regions, according to the location of the illumination region 44 and the locations of each of the three regions. The processor 201 outputs a color of illumination corresponding to the target region.

As shown in FIG. 5, the processor 201 divides the segmentation map 40 into three regions from left to right horizontally, such as the first sub-region 41, the second sub-region 42, and the third sub-region 43. The division of the segmentation map 40 in another embodiment may be vertically, from top to bottom. The processor 201 presets a corresponding color for each sub-region. For example, the processor 201 sets a left sub-region as a red light, sets a middle sub-region as a yellow light, and sets a right sub-region as a green light. The processor 201 determines which sub-region has high brightness such as the illumination region 44. In response that the processor 201 determines that the illumination region 44 is in the first sub-region 41, it will determine that the segmentation map 40 is a red light. In response that the processor 201 determines that the illumination region 44 is in the second sub-region 42, it will determine that the segmentation map 40 is a yellow light. In response that the processor 201 determines that the illumination region 44 is in the third sub-region 43, it will determine that the segmentation map 40 is a green light.

As shown in FIG. 5, in response that the illumination region 44 is in the first sub-region 41, and the first sub-region 41 is determined as the target region, the first sub-region 41 corresponds to a red light. Thus, recognition of the current color being shown by the traffic lights in a sunlit scene is achieved.

In one embodiment, the processor 201 may divide the segmentation map 40 into three equal regions according to a shape of the segmentation map 40. For example, in response that the extension direction of the segmentation map 40 is from left to right, that is, the horizontal length of the segmented map 40 is greater than its vertical length. Thus, the processor 201 divides the segmented map 40 into three regions from left to right along the length towards the horizontal direction. In response that the extension direction of the segmented map 40 is from top to bottom, that is, the vertical length of the segmented map 40 is greater than the horizontal length, the processor 201 divides the segmented map 40 vertically into three regions from top to bottom.

Figure 6:
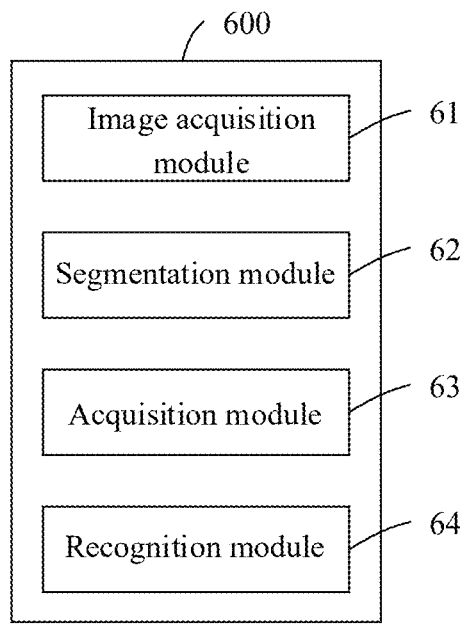
FIG. 6 is a block diagram of a device for recognizing illumination states of traffic lights provided in an embodiment of the present application.

FIG. 6 is a schematic structural diagram of a device for recognizing traffic lights provided in an embodiment of the present application.

As shown in FIG. 6, a device for recognizing traffic lights 600 includes an image acquisition module 61, a segmentation module 62, an acquisition module 63, and a recognition module 64.

The image acquisition module 61 acquires a first image that comprises a set of traffic lights.

The segmentation module 62 detects that the first image shows backlighting of a certain brightness, from the sun or otherwise, obtains a segmentation map by dividing a first region from the first image, in which the first region is an image region of the set of traffic lights.

The acquisition module 63 extracts an illumination region from the segmentation map.

The recognition module 64 recognizes a lit color of the set of traffic lights according to a position of the illumination region in the segmentation map.

Figure 7:
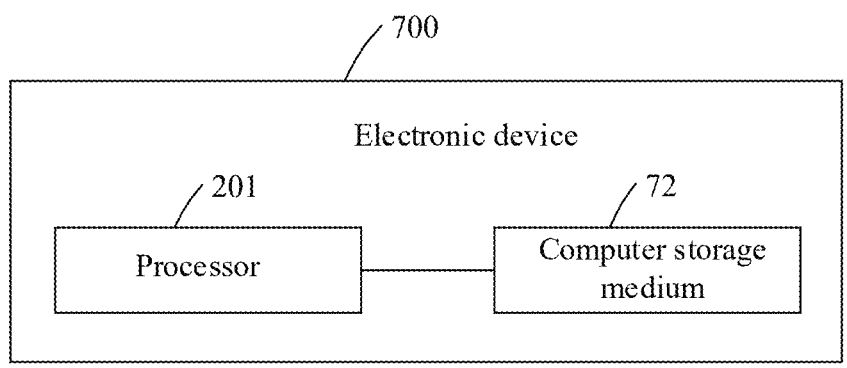
FIG. 7 is a block diagram of an electronic device for recognizing illumination states of traffic lights provided in an embodiment of the present application.

As shown in FIG. 7, the present application also discloses an electronic device 700, and the electronic device 700 may include at least one processor 201 (one processor 201 is taken as an example in the figure) and a computer storage medium (memory) 72. In addition, the processor 201 may invoke logic instructions in the computer storage medium 72 to perform the method in the above-described embodiments.

In addition, the logic instructions in the computer storage medium 72 may be implemented in the form of software functional units and sold or used as a stand-alone product. The computer storage medium 72 may be stored in a computer storage medium.

The computer storage medium 72 may be configured to store software programs or computer-executable programs, for example, may be configured as program instructions or modules corresponding to the methods in the embodiments of the present disclosure. The processor 201 executes functional applications and data processing by running software programs, instructions, or modules stored in the computer storage medium 72, to implement the method in the above embodiments.

The computer storage medium 72 may include a storage program region and a storage data region, the storage program region may store an operating system, an application program required for at least one function, and the storage data region may store data created according to the use of the terminal device, and the like. Additionally, the computer storage medium 72 may include high-speed random access computer storage media, and may also include non-volatile computer storage media. For examples, U disk, removable hard disk, read-only memory (ROM), random access memory (RAM), magnetic disk or optical disk and other media that can store program codes. The computer storage medium 72 may also be transitory.

The processor 201 loads and executes one or more instructions stored in the computer storage medium 72, and realizes the steps of the method flow shown in FIG. 2 above. Specifically, the processor 201 loads and executes one or more instructions in the computer storage medium, as follows:

In block S21, the processor 201 acquires a first image that includes a set of traffic lights.

In block S22, when the processor 201 detects backlighting of a certain brightness in the scene, a segmentation map is obtained by dividing a first region from the first image, in which the first region is an image region of the set of traffic lights 300.

In block S23, the processor 201 extracts an illumination region from the segmentation map.

In block S24, the processor 201 recognizes a lit color of the set of traffic lights according to a position of the illumination region in the segmentation map.

The above embodiments are only used to illustrate technical solutions of the present disclosure, rather than restrictions on the technical solutions. Although the present disclosure has been described in detail with reference to the above embodiments, those skilled in the art should understand that the technical solutions described in one embodiment can be modified, or some technical features can be equivalently substituted, and these modifications or substitutions are not to detract from the essence of the corresponding technical solutions or from the scope of the technical solutions of the embodiments of the present disclosure.

What is claimed is:

1. A method for recognizing traffic lights, comprising:
    acquiring a first image that comprises a set of traffic lights;
    recognizing a lit color of the set of traffic lights in the first image;
    in response that no lit color of the traffic lights is recognized, confirming that the first image is in a backlight scene;
    when confirming that the first image is in the backlight scene, obtaining a segmentation map by dividing a first region from the first image, in which the first region is an image region of the set of traffic lights;
    extracting an illumination region from the segmentation map, comprising: dividing the segmentation map into three regions equally, wherein each of the three regions corresponds to a signal light in the set of traffic lights; determining a brightness of each region of the three regions, and determining a region with the highest brightness among the three regions as the illumination region;
    recognizing a lit color of the set of traffic lights according to a position of the illumination region in the segmentation map, comprising: acquiring a location of the illumination region and a location of each of the three regions; determining a region where the illumination region is located from the three regions as a target region, according to the location of the illumination region and the location of each of the three regions; outputting a lit color corresponding to the target region.

2. The method of claim 1, wherein extracting an illumination region from the segmentation map comprises:
    converting a red green blue (RGB) color gamut of pixels in the segmentation map to a hue, saturation, value (HSV) color gamut, and obtaining a converted segmentation map;
    extracting the illumination region from the converted segmentation map using a preset threshold.

3. The method of claim 2, wherein extracting the illumination region from the converted segmentation map using a preset threshold comprises:
    acquiring a value of a V channel of each pixel in each of the three regions in the converted segmentation map;
    determining pixels whose values of the V channel in each of the three regions are greater than the preset threshold as first pixels of the corresponding region;
    determining a brightness of each of the three regions according to first pixels of each of the three regions, and determining the region with a highest brightness as the illumination region.

4. The method of claim 3, further comprising:
    acquiring values of the V channel of all pixels in the converted segmentation map;
    obtaining the preset threshold by averaging the values.

5. The method of claim 1, wherein obtaining a segmentation map by dividing a first region from the first image comprises:
    obtaining the segmentation map by using a segmentation network to divide the first region from the first image.

6. An electronic device comprising:
    a processor; and
    a storage device storing a plurality of instructions, which when executed by the processor, cause the processor to:
    acquire a first image that comprises a set of traffic lights;

recognize a lit color of the set of traffic lights in the first image:
in response that no lit color of the traffic lights is recognized, confirm that the first image is in a backlight scene;
when confirming that the first image is in the backlight scene, obtain a segmentation map by dividing a first region from the first image, in which the first region is an image region of the set of traffic lights;
extract an illumination region from the segmentation map, comprising: dividing the segmentation map into three regions equally, wherein each of the three regions corresponds to a signal light in the set of traffic lights: determining a brightness of each region of the three regions, and determining a region with the highest brightness among the three regions as the illumination region;
recognize a lit color of the set of traffic lights according to a position of the illumination region in the segmentation map, comprising: acquiring a location of the illumination region and a location of each of the three regions; determining a region where the illumination region is located from the three regions as a target region, according to the location of the illumination region and the location of each of the three regions: outputting a lit color corresponding to the target region.

7. The electronic device of claim 6, wherein the processor is further caused to:
convert a red green blue (RGB) color gamut of pixels in the segmentation map to a hue, saturation, value (HSV) color gamut, and obtain a converted segmentation map;
extract the illumination region from the converted segmentation map using a preset threshold.

8. The electronic device of claim 7, wherein the processor is further caused to:
acquire a value of a V channel of each pixel in each of the three regions in the converted segmentation map;
determine pixels whose values of the V channel in each of the three regions are greater than the preset threshold as the first pixels of the corresponding region;
determine a brightness of each of the three regions according to first pixels of each of the three regions, and determining the region with a highest brightness as the illumination region.

9. The electronic device of claim 8, wherein the processor is further caused to:
acquire values of the V channel of all pixels in the converted segmentation map;
obtain the preset threshold by averaging the values.

10. The electronic device of claim 6, wherein the processor is further caused to:
obtain the segmentation map by using a segmentation network to divide the first region from the first image.

11. A non-transitory storage medium having stored thereon at least one computer-readable instructions that, when executed by a processor of an electronic device, causes the processor to perform a method for recognizing traffic lights, the method comprising:
acquiring a first image that comprises a set of traffic lights;
recognizing a lit color of the set of traffic lights in the first image;
in response that no lit color of the traffic lights is recognized, confirming that the first image is in a backlight scene;
when confirming that the first image is in the backlight scene, obtaining a segmentation map by dividing a first region from the first image, in which the first region is an image region of the set of traffic lights;
extracting an illumination region from the segmentation map, comprising: dividing the segmentation map into three regions equally, wherein each of the three regions corresponds to a signal light in the set of traffic lights; determining a brightness of each region of the three regions, and determining a region with the highest brightness among the three regions as the illumination region;
recognizing a lit color of the set of traffic lights according to a position of the illumination region in the segmentation map, comprising: acquiring a location of the illumination region and a location of each of the three regions; determining a region where the illumination region is located from the three regions as a target region, according to the location of the illumination region and the location of each of the three regions; outputting a lit color corresponding to the target region.

12. The non-transitory storage medium of claim 11, wherein extracting an illumination region from the segmentation map comprises:
converting a red green blue (RGB) color gamut of pixels in the segmentation map to a hue, saturation, value (HSV) color gamut, and obtaining a converted segmentation map;
extracting the illumination region from the converted segmentation map using a preset threshold.

13. The non-transitory storage medium of claim 12, wherein extracting the illumination region from the converted segmentation map using a preset threshold comprises:
acquiring a value of a V channel of each pixel in each of the three regions in the converted segmentation map;
determining pixels whose values of the V channel in each of the three regions are greater than the preset threshold as the first pixels of the corresponding region;
determining a brightness of each of the three regions according to first pixels of each of the three regions, and determining the region with a highest brightness as the illumination region.

14. The non-transitory storage medium of claim 13, further comprising:
acquiring values of the V channel of all pixels in the converted segmentation map;
obtaining the preset threshold by averaging the values.

15. The non-transitory storage medium of claim 11, wherein obtaining a segmentation map by dividing a first region from the first image comprises:
obtaining the segmentation map by using a segmentation network to divide the first region from the first image.

* * * * *